United States Patent
Barlow et al.

(10) Patent No.: US 8,764,404 B2
(45) Date of Patent: Jul. 1, 2014

(54) DIFFUSION BONDED AND SUPERPLASTICALLY FORMED TURBOMACHINE BLADE

(75) Inventors: Simon M. Barlow, Keighley (GB); Michael J. Wallis, Clitheroe (GB)

(73) Assignee: Rolls-Royce PLC, London (GB)

( * ) Notice: Subject to any disclaimer, the term of this patent is extended or adjusted under 35 U.S.C. 154(b) by 355 days.

(21) Appl. No.: 13/328,579

(22) Filed: Dec. 16, 2011

(65) Prior Publication Data
US 2012/0163983 A1 Jun. 28, 2012

(30) Foreign Application Priority Data
Dec. 23, 2010 (GB) .................................. 1021789.1

(51) Int. Cl.
*F01D 5/14* (2006.01)

(52) U.S. Cl.
USPC .................................. 416/229 R; 416/229 A

(58) Field of Classification Search
USPC ........................... 416/229 R, 229 A, 232, 233
See application file for complete search history.

(56) References Cited

U.S. PATENT DOCUMENTS

| | | | |
|---|---|---|---|
| 5,479,705 A | 1/1996 | Fowler et al. | |
| 5,896,658 A * | 4/1999 | Calle et al. | 29/889.72 |
| 6,871,398 B2 * | 3/2005 | Richardson et al. | 29/889.72 |
| 8,382,441 B2 * | 2/2013 | Brennand et al. | 416/229 R |
| 8,555,501 B2 * | 10/2013 | Brennand | 29/889.72 |

FOREIGN PATENT DOCUMENTS

| | | |
|---|---|---|
| EP | 2 223 757 A1 | 9/2010 |
| EP | 2 223 766 A1 | 9/2010 |

OTHER PUBLICATIONS

British Search Report dated Jan. 20, 2011 issued in British Application No. GB 1021789.1.

* cited by examiner

*Primary Examiner* — Igor Kershteyn
(74) *Attorney, Agent, or Firm* — Oliff PLC

(57) ABSTRACT

A diffusion bonded and superplastically formed turbomachine blade, the turbomachine blade comprising: a first layer (4); a second layer (6); and a membrane (2) disposed between the first and second layers (4, 6); wherein the membrane (2) is diffusion bonded to the first layer (4) along a plurality of first strips (10) and the membrane (2) is diffusion bonded to the second layer (6) along a plurality of second strips (12), wherein the first and second strips (10, 12) are offset from one another so that the membrane (2) is bonded to the first and second layers (4, 6) in an alternating pattern; wherein the membrane (2) has a recess (28) which extends into an area between an adjacent pair of first or second strips (10, 12).

18 Claims, 4 Drawing Sheets

DIFFUSION BONDED AND SUPERPLASTICALLY FORMED TURBOMACHINE BLADE

The present invention relates to a diffusion bonded and superplastically formed turbomachine blade and particularly, but not exclusively, to a turbomachine blade which has a construction that allows even entry of gas into the blade during the superplastic forming process.

BACKGROUND

It is known to manufacture hollow metallic turbomachine blades, in particular fan blades for a jet engine, by superplastic forming and diffusion bonding metal workpieces, the workpieces forming pressure and suction surfaces of the blade. These metal workpieces may include elementary metal, metal alloys and metal matrix composites. At least one of the metal workpieces may be capable of superplastic extensions. In one known process the surfaces of the workpieces to be joined are cleaned, and at least one surface of one or more of the workpieces is coated in preselected areas with a stop-off material to prevent diffusion bonding. The workpieces are arranged in a stack and the edges of the workpieces are welded together, except where a pipe is welded to the workpieces, to form an assembly. The pipe enables a vacuum, or inert gas pressure, to be applied to the interior of the assembly. The assembly is placed in an autoclave and heated so as to "bake out" the binder from the material to prevent diffusion bonding. The assembly may then be evacuated, using the pipe, and the pipe is sealed. The sealed assembly is placed in a pressure vessel and is heated and pressed to diffusion bond the workpieces together to form an integral structure. Diffusion bonding occurs when two matt surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the workpieces to be superplastically formed to produce an article matching the shape of the dies.

In addition to the hollow structure just described, it is also known to insert a membrane 2 between the metal workpieces (i.e. first and second layers 4, 6 which form pressure and suction surfaces 18, 16 respectively) prior to the above described process (see FIG. 1 for example). The location of diffusion bonds between the membrane and the adjacent workpieces can be controlled by applying the stop-off material to preselected areas on each side of the membrane (or respective workpieces). When the blade is subsequently expanded, the membrane adheres to the workpieces where the diffusion bond is allowed to form and thereby provides an internal structure.

Various internal structures have been proposed and different preselected patterns of the stop-off material are required to achieve these structures. For example, U.S. Pat. No. 5,479,705 discloses an internal structure with a Warren girder type cross-section, which is formed by a pattern of alternating strips 10, 12 on either side of the membrane where there is no stop-off material (see FIG. 2 for example). Such blades are better at withstanding a bird strike due to the presence of a crumple zone which allows them to yield rather than fracture. However, during the expansion of the blade the membrane may stick to the pressure surface workpiece in the region between the blade tip and the edge of the aforementioned strips, since the stop-off material adheres to the second layer 6. This sticking may inhibit the expansion during the superplastic process. This can be particularly problematic for the pressure surface since it should move the most during the expansion process and since the shape of the pressure surface of a fan blade is aerodynamically very important.

To prevent the membrane from sticking to the second layer 6, a pattern comprising the previously mentioned strips 10, 12 but with additional dots 14 on the suction side has been proposed, as shown in FIG. 2. The strips 10 are on the suction side and the strips 12 are on the pressure side (see FIG. 2). The ends of the strips 10 on the suction side are spaced further from the blade tip than the ends of the strips 12 on the pressure side. With such a bond pattern, the dots 14 are in the tip area of the blade and are in line with the strips 10 on the suction side 16 of the membrane.

The dots 14 define further regions in which there is no stop-off material and in which a diffusion bond is allowed to form. The dots 14 therefore ensure that the membrane 2 adheres to the first layer 4 at the tip region and keep the membrane 2 away from the second layer 6 so as not to inhibit the expansion of the pressure surface 18 (see FIG. 4).

The membrane 2 is further provided with a D-shaped recess 20 which extends into the membrane 2 from the blade tip towards the strips 10, 12, FIG. 3. During the superplastic forming process, the pressurised fluid is supplied through the pipe 22 into the interior of the blade via the D-shaped recess 20. The D-shaped recess 20 is intended to allow the fluid to enter the blade on either side of the membrane 2 and thus should provide an equal pressure difference on both sides of the membrane 2 to form the internal structure within the blade.

As a result of the bonds between the membrane 2 and the first and second layers 4, 6 formed by the strips 10, 12 and dots 14, the membrane 2 is deformed along a series of axes, as indicated by lines 24 in FIG. 3. The axes are drawn between the origin of the D-shaped recess 20, the bonds at the dots 14 on the suction side 16 and the bonds along the strips 12 on the pressure side. Furthermore, the membrane 2 is deformed between the strips 10 on the suction side and the strips 12 on the pressure side.

Conventionally, the D-shaped recess 20 has a radius of 6 mm and the dots 14 on the suction side 16 are located at a fixed distance from the edge of the membrane, the distance being typically between two and three times (inclusive) the radius of the D-shaped recess.

However, this known design does not reliably achieve an equal pressure on both sides of the membrane 2 during the superplastic forming process. Consequently, the required internal structure may not be correctly formed by the membrane 2, and may result in 'Arched Webs'. In order to distribute the pressurised fluid from the D-shaped recess 20 across the entire blade, the region between the tip of the blade and the edges of the slots 10, 12 must expand to form a manifold 26. However, if the pressurised fluid does not attain an equal pressure on either side of the membrane 2 during initial inflation, the membrane 2 is forced into the lower pressure side resulting in arched webs. Such components are unacceptable and therefore result in waste and consequently increased component cost.

STATEMENTS OF INVENTION

In accordance with an aspect of the invention, there is provided a diffusion bonded and superplastically formed turbomachine blade, the turbomachine blade comprising: a first layer; a second layer; and a membrane disposed between the first and second layers; wherein the membrane is diffusion bonded to the first layer along a plurality of first strips and the membrane is diffusion bonded to the second layer along a plurality of second strips, wherein the first and second strips are offset from one another so that the membrane is bonded to the first and second layers in an alternating pattern; wherein the membrane has a recess which extends into an area between an adjacent pair of first or second strips.

The recess may ensure separation of the membrane from the first and second layers and may allow even pressure distribution between the membrane and the first and second layers. Accordingly, the recess may reduce the occurrence of arched webs and thus may reduce the scrap rate.

The recess may be located in an area which is stress neutral and therefore the recess does not affect the function of the internal structure or the blade.

The strips may be spaced from an edge of the turbomachine blade and the membrane may be diffusion bonded to the first and/or second layers at a plurality of dots located between the edge of the turbomachine blade and the strips.

The first strips may be spaced further from an edge of the turbomachine blade than the second strips.

An end of the recess may be located substantially equidistant between the adjacent pair of first or second strips.

An end of the recess may be located closer to one of the pair of first or second strips than the other of the pair of first or second strips. This may allow the recess to extend further into the area between the adjacent pair of first or second strips.

The recess may taper towards its end.

The recess may be v-shaped.

An end of the recess may have a radius.

The radius may be greater than or equal to a radius of an end of the first or second strips The radius may be less than or equal to a distance between adjacent first and second strips.

The radius may be less than or equal to a radius at a tip end of the recess.

The first layer may form a suction surface of the turbomachine blade and the second layer may form a pressure surface of the turbomachine blade.

The recess may extend into an area between an adjacent pair of second strips.

The turbomachine blade may be a compressor fan blade.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 5:
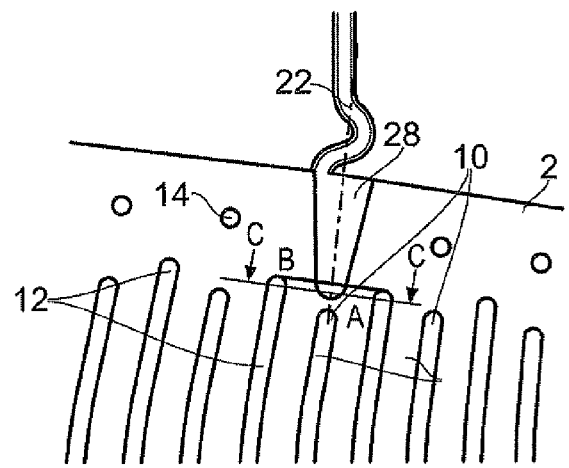
FIG. 5 is a view of a fan blade with a membrane according to an embodiment of the invention.
Figure 6:
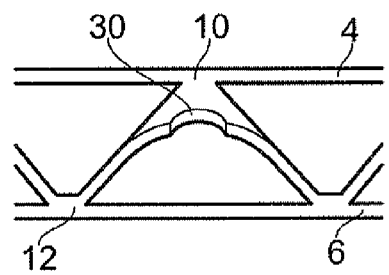
FIG. 6 is a cross-sectional view of the fan blade of FIG. 3 through the line C-C.
Figure 7:
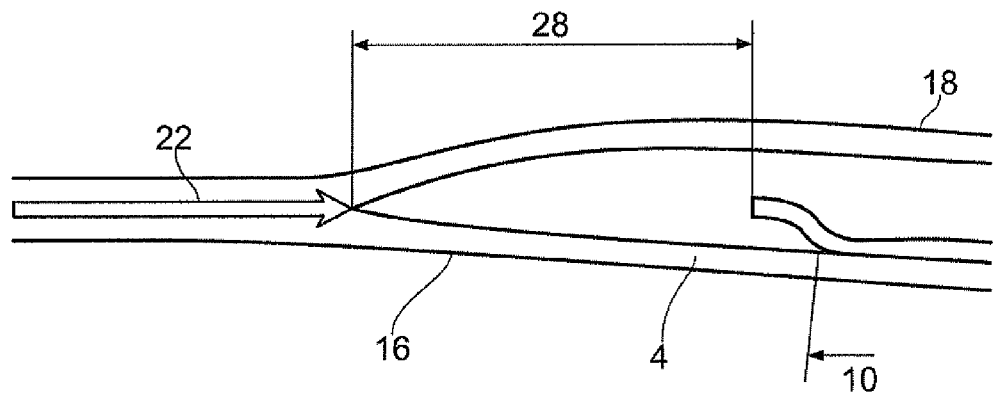
FIG. 7 is a cross-sectional view of the fan blade of FIG. 3 through the line A-A.

With reference to FIGS. 5 to 7, a turbomachine blade according to a first embodiment of the present invention comprises a first layer 4 forming a suction surface 16, and a second layer 6 forming a pressure surface 18 of the blade. A membrane 2 is disposed between the first and second layers 4, 6. The membrane 2 has an extended v-shaped recess 28 which tapers from an end at the extent of the pipe 22 in the membrane 2 to a distal end.

Figure 1:
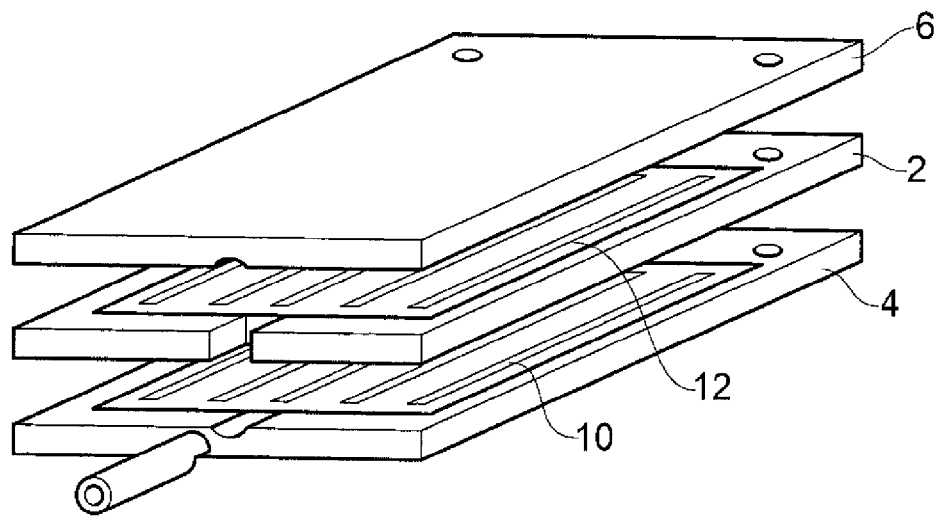
FIG. 1 illustrates an exploded view of a prior art arrangement of workpieces which are superplastically formed and diffusion bonded to form a fan blade.
Figure 2:
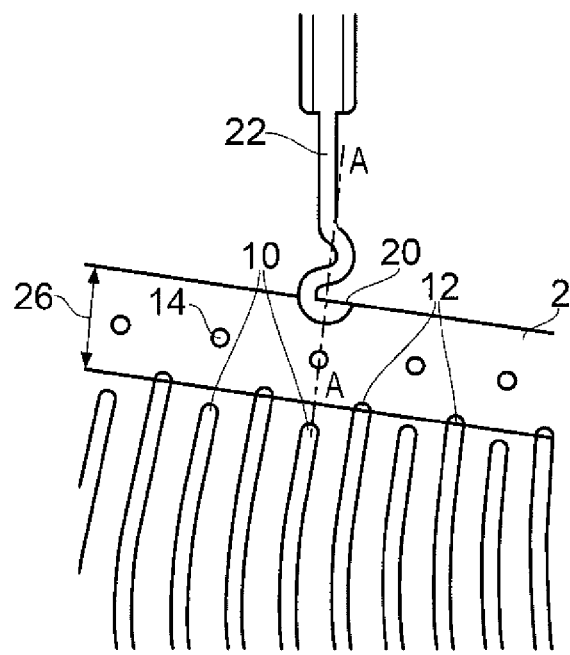
FIG. 2 is a view of a fan blade in the region of the tip having a conventional membrane and stop-off material pattern.
Figure 3:
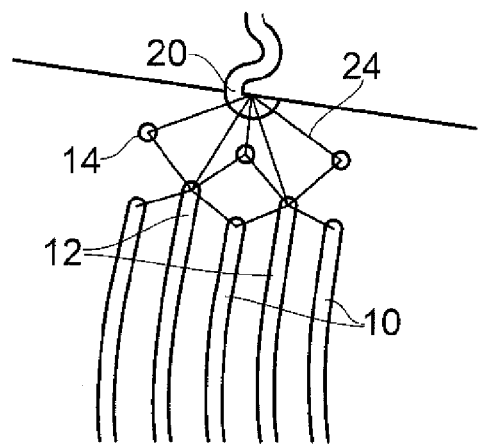
FIG. 3 shows the axes of membrane formation for the stop-off material pattern of FIG. 2.
Figure 4:
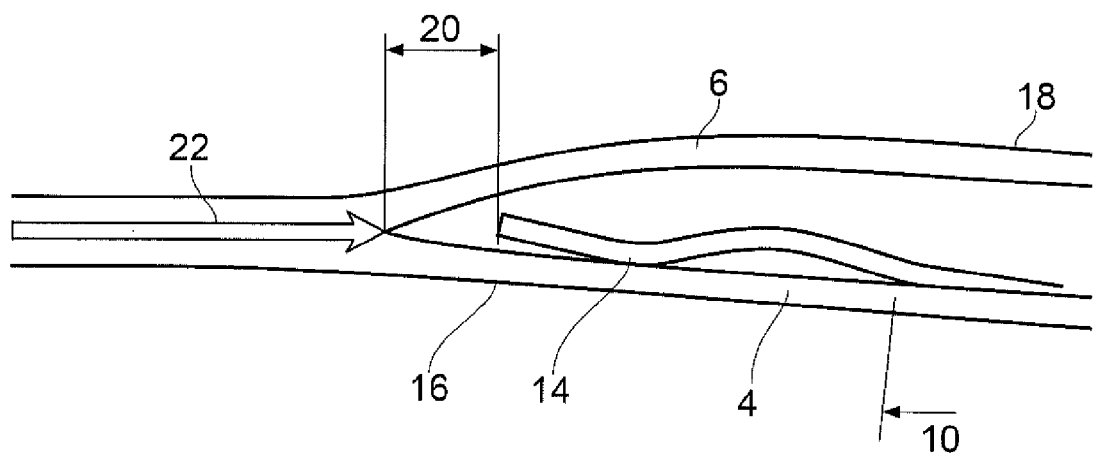
FIG. 4 is a cross-sectional view of the fan blade of FIG. 2 through the line A-A.

Prior to bonding the first and second layers 4, 6 to the membrane 2, a stop-off material is applied to both the first and second layers 4, 6 on the sides closest to the membrane 2. The stop-off material may alternatively be applied to the respective sides of the membrane 2. Once the stop-off material has been applied, the layers are stacked together and heat and pressure are applied such that a diffusion bond is formed between the respective layers, except that a diffusion bond is not formed where the stop-off material has been applied. The stop-off material is applied in a conventional pattern as described with reference to FIG. 2. Accordingly, diffusion bonds are formed between the membrane 2 and the first layer 4 along a plurality of first strips 10 and at a plurality of dots 14. Furthermore, diffusion bonds are formed between the membrane 2 and the second layer along a plurality of second strips 12. The first and second strips 10, 12 are offset from one another so that the membrane 2 is bonded to the first and second layers 4, 6 in an alternating pattern. Furthermore, the first strips 10 are spaced further from the tip edge of the blade than the second strips 12.

As shown in FIG. 5, the recess 28 of the membrane 2 extends into an area between an adjacent pair of the second strips 12. The recess 28 extends over a line B drawn between the ends of the second strips 12. The recess 28 is located substantially equidistant between the adjacent pair of the second strips 12 and is thus aligned with the first strip 10 located between the pair of second strips 12.

The distal end of the recess 28 has a radius. The radius is greater than or equal to a radius applied to the end of the first and/or second strips 10, 12 (typically 1.5 mm). Furthermore, the radius of the distal end of the recess 28 is less than or equal to the smaller of: the radius of the tip end of the recess (i.e. 6 mm) or the gap between the adjacent strips 12.

The blade is located between appropriately shaped dies and is placed within an autoclave. The blade and dies are heated and pressurised fluid is supplied into the interior of the blade to cause at least one of the layers to be superplastically formed to produce a blade matching the shape of the dies. The blade may also be twisted into shape.

The membrane therefore forms a warren girder type internal structure with the membrane between adjacent strips 10, 12 forming struts and ties between the first and second layers 4, 6, as shown in FIG. 6. The encroachment of the recess 28 into the area between the second strips 12 creates a hole 30 in the membrane 2 that links both pressure and suction sides of the cavity, thus allowing the pressurising fluid to achieve an even balance of pressure.

Figure 8:
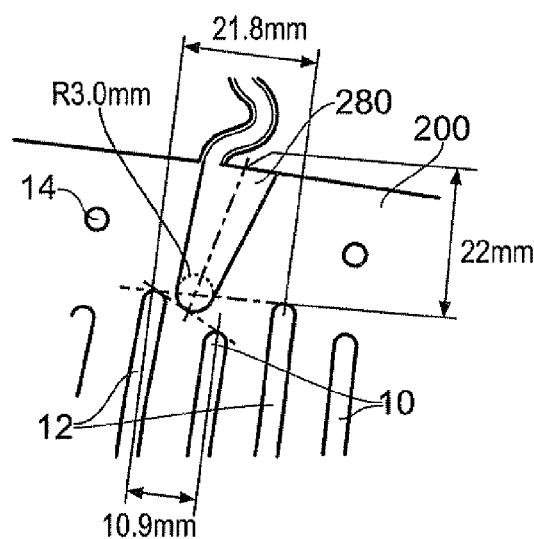
FIG. 8 is a view of a fan blade with a membrane according to another embodiment of the invention.

With reference to FIG. 8, a turbomachine blade according to another embodiment of the invention is shown. The blade has a membrane 200 which comprises a recess 280 with an alternative geometry. In contrast to the recess 28, the recess 280 is located closer to one of the pair of second strips 12 than the other of the pair of second strips 12. Consequently, the distal end of the recess 280 is not aligned with the first strip 10 located between the adjacent pair of second strips 12. FIG. 8 further shows the dimensions of the blade, however these are provided for illustration only.

Although a preferred geometry of the recess 28, 280 has been described, various modifications could be made. For example, the recess 28, 280 need not taper from the edge of the membrane to the distal end of the recess 28, 280, but could instead have a uniform width along its length. Furthermore, the membrane 2, 200 could be used with other patterns of stop-off material than the one described. For example, it is not necessary that the first strips 10 are spaced further from the tip edge of the blade than the second strips 12. Instead, the first and second strips 10, 12 may be spaced an equal distance from the tip edge and the recess 28, 280 may extend into an area between a pair of adjacent first and second strips 10, 12. In addition, the pattern of the stop-off material may prevent the membrane 2, 200 from being bonded to the first layer 10 at the dots 14.

By extending the recess into the area between the second strips 12, the pressurised fluid used to superplastically form the blade has a greater and more instantaneous effect on the membrane and the formation of the internal structure. Consequently, the recess 28, 280 ensures that the manifold 26 correctly opens and thereby prevents the occurrence of arched webs.

The extended recess 28, 280 of the membrane 2, 200 does not affect any of the parameters for the manufacture of the blade, and therefore the invention is simple and cost effective to implement. The additional metal removed by the revision of recess is in the region of 0.45 gms. Furthermore, the recess is located in a stress neutral area of the blade and its extension into the blade is not detrimental to the performance of the internal structure or of the blade itself.

The membrane 2, 200 may be implemented in any turbomachine blade and is not limited to fan blades.

The invention claimed is:

1. A diffusion bonded and superplastically formed turbomachine blade, the turbomachine blade comprising:
    a first layer;
    a second layer; and
    a membrane disposed between the first and second layers; wherein:
    the membrane is diffusion bonded to the first layer along a plurality of first strips and the membrane is diffusion bonded to the second layer along a plurality of second strips, wherein the first and second strips are offset from one another so that the membrane is bonded to the first and second layers in an alternating pattern; and
    the membrane has a recess which extends into an area between an adjacent pair of first or second strips.

2. The turbomachine blade as claimed in claim 1, wherein the strips are spaced from an edge of the turbomachine blade, and
    the membrane is diffusion bonded to the first and/or second layers at a plurality of dots located between the edge of the turbomachine blade and the strips.

3. The turbomachine blade as claimed in claim 1, wherein the first strips are spaced further from an edge of the turbomachine blade than the second strips.

4. The turbomachine blade as claimed in claim 1, wherein the strips are spaced from an edge of the turbomachine blade,
    the membrane is diffusion bonded to the first and/or second layers at a plurality of dots located between the edge of the turbomachine blade and the strips, and
    the first strips are spaced further from an edge of the turbomachine blade than the second strips.

5. The turbomachine blade as claimed in claim 1, wherein an end of the recess is located substantially equidistant between the adjacent pair of first or second strips.

6. A The turbomachine blade as claimed in claim 1, wherein
    the first strips are spaced further from an edge of the turbomachine blade than the second strips, and
    an end of the recess is located substantially equidistant between the adjacent pair of first or second strips.

7. The turbomachine blade as claimed in claim 1, wherein an end of the recess is located closer to one of the pair of first or second strips than the other of the pair of first or second strips.

8. The turbomachine blade as claimed in claim 1, wherein the recess tapers towards its end.

9. The turbomachine blade as claimed in claim 1, wherein
    the first strips are spaced further from an edge of the turbomachine blade than the second strips, and
    an end of the recess is located substantially equidistant between the adjacent pair of first or second strips, the recess tapering towards its end.

10. The turbomachine blade as claimed in claim 1, wherein the recess is v-shaped.

11. The turbomachine blade as claimed in claim 1, wherein an end of the recess has a radius.

12. A The turbomachine blade as claimed in claim 1, wherein
    the first strips are spaced further from an edge of the turbomachine blade than the second strips, and
    an end of the recess is located substantially equidistant between the adjacent pair of first or second strips, the recess tapering towards its end, the end of the recess having a radius.

13. The turbomachine blade as claimed in claim 11, wherein the radius is greater than or equal to a radius of an end of the first or second strips.

14. The turbomachine blade as claimed in claim 11, wherein the radius is less than or equal to a distance between adjacent first and second strips.

15. The turbomachine blade as claimed in claim 11, wherein the radius is less than or equal to a radius at a tip end of the recess.

16. The turbomachine blade as claimed in claim 1, wherein the first layer forms a suction surface of the turbomachine blade and the second layer forms a pressure surface of the turbomachine blade.

17. The turbomachine blade as claimed in claim 16, wherein the recess extends into an area between an adjacent pair of second strips.

18. The turbomachine blade as claimed in claim 1, wherein the blade is a compressor fan blade.

* * * * *